July 6, 1943.　　F. W. DUNMORE ET AL　　2,323,317
ALTITUDE MEASURING
Filed Feb. 5, 1940　　2 Sheets-Sheet 1

Francis W. Dunmore,
Evan G. Lapham,
INVENTORS,

BY *J. F. Mothershead*

ATTORNEY

July 6, 1943.   F. W. DUNMORE ET AL   2,323,317
ALTITUDE MEASURING
Filed Feb. 5, 1940   2 Sheets-Sheet 2

Francis W. Dunmore,
Evan G. Lapham,
INVENTORS,

BY

ATTORNEY

Patented July 6, 1943

2,323,317

UNITED STATES PATENT OFFICE 2,323,317

ALTITUDE MEASURING

Francis W. Dunmore and Evan G. Lapham, Washington, D. C., assignors to the Government of the United States of America, as represented by the Secretary of Commerce Application February 5, 1940, Serial No. 317,320

3 Claims. (Cl. 177—380)

(Granted under the act of March 3, 1883, as amended April 30, 1928; 370 O. G. 757)

The invention described herein may be made and used by and for the Government of the United States for governmental purposes without the payment to us of any royalty therefor.

The invention relates to altitude measuring and aims generally to improve the same. The invention is particularly, but not exclusively, adapted to the use of radio on a mobile object in free space, for sending signals which are a function of the altitude of the object. The invention is of great advantage in radio meteorography where it is important to know the altitude of the balloon carrying the radio meteorograph apparatus. It also finds application in aviation where it is becoming more and more important that each aircraft send radio signals which are a function of its altitude, for the purpose of collision prevention.

Briefly, the means for accomplishing these results may comprise a mobile object in free space carrying a small battery-operated ultra-high radio frequency transmitter with a special form of audio moludator, the frequency of which is a function of a resistance in its control grid circuit. For varying this audio note according to the altitude of the mobile object this resistor in accordance with the present invention is composed of an ionized air gap, the resistance of which is a function of the amount of air in the gap. As the altitude is a function of air pressure (with corrections) the note produced by the audio oscillator will be a function of altitude. As the amount of ionized air in the gap decreases, the resistance of the air gap increases, causing the transmitted note to decrease in frequency as the mobile object ascends. The air gap may be ionized, for example, as by radio-active material carried between or on one or both of the gap terminals or by a high voltage applied between a third fine-wire terminal and one of the gap electrodes or by a combination of both.

Other and further objects of our invention will be apparent from the following detailed description and the accompanying drawings. It is expressly understood, however, that these drawings are for the purpose of illustration only and not designed for a definition of the limits of our invention. Referring to the illustrations:

Figure 1:
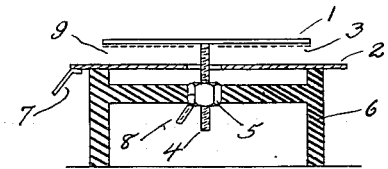
Fig. 1 represents one form of our device consisting of a variable air gap between two insulated metal plates with a radio-active coating on one of the plates.
Figure 2:
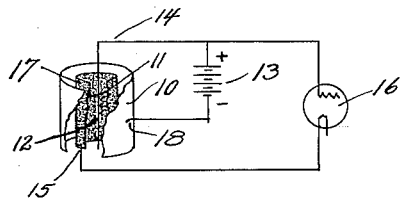
Fig. 2 shows another form of our device in which the gap is ionized by a high voltage.

Referring to the drawings more in detail:

Fig. 1 represents one form of our apparatus in which the conducting plates forming the ionic altimeter terminals are shown at 1 and 2. These plates may be in the nature of discs insulated from each other by base 6 supporting them. The underside of disc 1 is in the form shown provided with a coating 3 of polonium or radioactive material rich in alpha radiations as it is these radiations which produce the greatest ionization in the air gap 9 between the two plates 1 and 2. It is this air gap which forms a variable resistor the value of which is a function of the density (altitude) of the air between the plates. This resistor operates in an audio-frequency oscillator circuit to change the generated audio frequency in proportion to the air density in the gap 9. The spacing of gap 9 may be varied by rotating plate 1 which is held by screw 4 threading through bushing 5. Terminals 7 and 8 go to the audio-oscillator circuit. The coating 3, positioned between the plates, may be deposited directly on plate 1; or may be secured thereto by a binder or retained in place by an enclosing sheet as of mica. The binder or enclosing element, if used, should be extremely thin so as not to impede the alpha radiations which are stopped by even 6 or 7 centimeters of air at normal sea level densities. While we have mentioned polonium and radium as sources for alpha radiations we do not limit our invention to the use of these materials. It is possible to ionize an air gap by impressing a high voltage on the gap if one terminal of the gap is composed of a very fine wire of the order of −0.003 inch in diameter. Such an arrangement is shown in Fig. 2, where 12 is the fine wire at a positive potential of several thousand volts with respect to an outer concentric cylinder 10. A battery or other direct-current source 13 is connected to the wire 12 at 14 and the outer terminal 10 at 18. The air in the cylinder 10 is thereby ionized. A coating of polonium or radium may be put on the wire 14 to assist in the ionization of the air. An intermediate grid 11 with perforations 17 is interposed between the wire 12 and cylinder 10. The ionized air between this grid and wire 12 forms the resistor whose value is a function of the air density within the grid 11. By connecting the wire 12 and the grid 11 to the audio oscillator 16 the frequency of oscillation of 16 will be a function of the air density (altitude).

Figure 3:
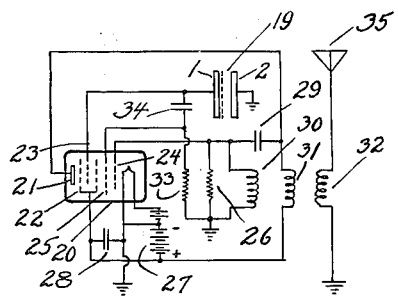
Fig. 3 shows a one-tube circuit arrangement for producing a carrier wave modulated by a variable note as the air is removed from the gap between the plates of the ionic altimeter unit connected in circuit as shown.

In Fig. 3 is shown the ionic altimeter 19 in a circuit arrangement for transmitting a carrier wave modulated at a frequency which is a function of the air density (resistance) between the plates 1 and 2 of the ionic altimeter 19. The circuit is of the relaxation-oscillation type composed of tube 20 which may be of the 1A6 type. The 1st grid 24 is connected through resistor 26 to ground and to oscillator coil 30 and condenser 29. The second grid No. 25 is connected to condenser 34 and resistor 33 the values of which together with the air gap between the plates 1 and 2 determine the modulation frequency of tube 20. The 3rd and 5th grids are connected to the positive side of battery 27 with by-pass condenser 28. The 4th grid 23 is connected to condenser 34 and plate 1 of ionic altimeter 19. Plate 2 is grounded as well as the filament of tube 20. The plate 21 of tube 20 is connected to coil 31 which is coupled to 30 and forms with 29 the radio-frequency oscillatory circuit. The radio-frequency energy in 31 passes to antenna 35 by way of coil 32. The low-modulation frequency in grids 25 and 23 is impressed on the carrier in coil 31 by a modulation of the space current to plate 21. Thus a radio frequency is sent out from antenna 35 carrying a modulation which is a function of the air density (resistance) (altitude) between plates 1 and 2 of ionic altimeter 19. A decrease in air density results in a lower modulation frequency.

We have found that for best operation the ionic altimeter air gap should have a definite length depending upon the radio-active coating and the constants of the associated circuit.

Figure 4:
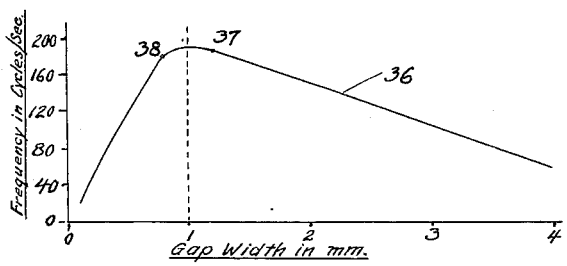
Fig. 4 shows how the gap width effects the frequency (resistance) of the circuit in which the ionic altimeter is connected.

In Fig. 4 at 36 is shown the effect of varying the air gap from 0 to 4 mm. As the gap is opened up from 0 at ground air pressure the modulation frequency produced by its associated circuit such as shown in Fig. 3, increases (resistance decreases) until an optimum gap of 1 mm. is reached, then the frequency starts to decrease again. As a decrease in air density also causes the frequency to decrease, it is important to set the gap at a width as shown at 38 just a little under the optimum value of 1 mm. Then as the air density decreases a continuous decrease in frequency will result. Should the gap having been set as shown at 37 and the air density decreased, very little change in frequency will be experienced at first.

Figure 5:
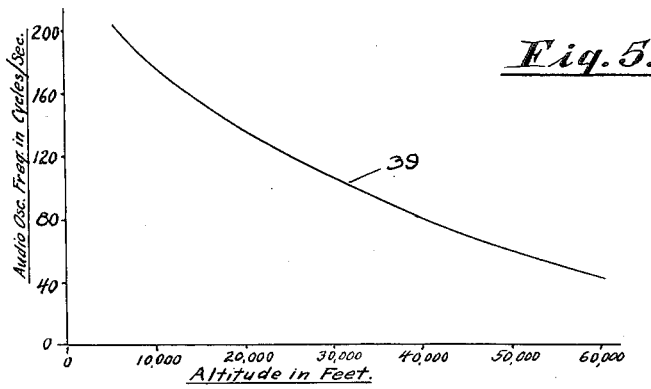
Fig. 5 shows the altitude-frequency (resistance) characteristic for the ionic altimeter in a circuit such as Fig. 3.

In Fig. 5 at 39 is shown an altitude frequency characteristic obtained experimentally with the ionic altimeter and circuit arrangement shown in Fig. 3. The gap had been set near the point 38, Fig. 4. It will be noted that the frequency decreases continuously as the altitude is increased.

Figure 6:
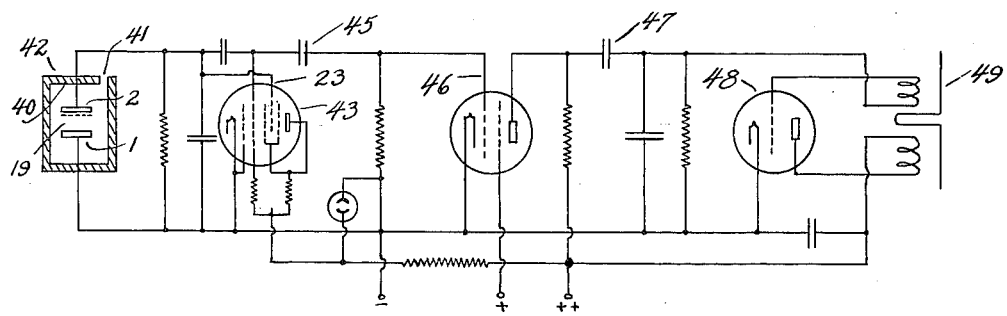
Fig. 6 shows a 3-tube circuit arrangement in which the ionic altimeter varies the frequency of an audio oscillator which frequency is amplified and modulates an ultra-high radio-frequency carrier wave.

In Fig. 6 is shown the ionic altimeter 19 in a container 42 comprising thermal insulating means 40. A small pinhole 41 is provided so that the air inside 42 will always be in equilibrium relative to pressure with the outside air. As the pressure always decreases in the case of an ascent the air will always move outward through the pinhole 41. The ionic altimeter and air in chamber 42 will be held more nearly at constant temperature due to thermal insulation walls 40. In this figure the ionic altimeter is shown connected to the 4th grid 23 of the relaxation oscillator 43. This oscillator is similar to that shown at 20 in Fig. 3 except the radio-frequency oscillator portion 29, 30 and 31 is eliminated and the output of tube 43 is passed through condenser 45 to audio amplifier 46 thence through condenser 47 to ultra-high radio frequency oscillator 48 which it modulates; the modulated signal being radiated by antenna 49.

Figure 7:
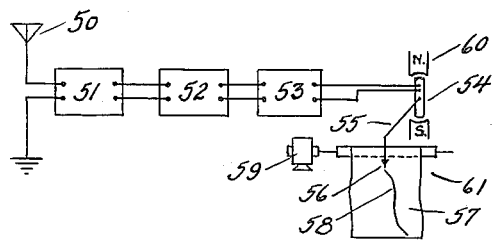
Fig. 7 shows a receiving and graphical frequency recording apparatus for recording the altitude and other signals.

In Fig. 7 is shown the equipment for receiving and recording the ionic altimeter signals. In this figure, 50 represents the antenna, 51 the receiver for the signal radiated from antenna 35, Fig. 3 (antenna 49, Fig. 6). 52 is a filter circuit for the band of modulation frequencies produced by the ionic altimeter. 53 is a direct-reading frequency meter which may be of the General Radio Co. electronic type. 61 is a graphical recorder with moving element 54 connected to the output of 53. 54 carries pen 56 on arm 55 attached to 54. Pen 56 produces graph 58 on paper 57. Paper 57 is moved under pen 56 by motor 59. The graph 58 is a record of the modulation frequency received by 51 which is equivalent to altitude when the ionic altimeter controls the modulation frequency of the transmitter.

Figure 8:
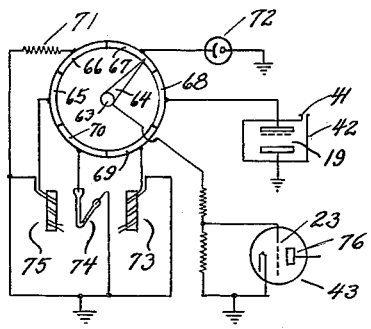
Fig. 8 shows the combination of the ionic altimeter with temperature and humidity indicating means with switching commutator for use in a radio meteorograph.

In Fig. 8 is shown a combination in which the ionic altimeter serves to give altitude when determining temperature, humidity and light brightness (cloud height and thickness). In this figure the 4th grid 23 is connected to the revolving arm 64 of a commutator 62. Shaft 63 attached to arm 64 is rotated by any suitable means such, for example, as an air vane, clockwork or electric motor. Arm 64 contacts six segments as it rotates. Segment 67 is connected to a light sensitive device 72, segment 68 is connected to ionic altimeter 19, which may or may not be in housing 42 with pinhole 41. Segment 69 is connected to a dual-coil electric hygrometer 73 which may consist of a thin wall glass tube with a dual winding on the outside of the tube, the glass surface being roughened and coated with a hygroscopic material. The glass surface between the dual windings forms a resistor whose resistance is a function of relative humidity. Segment 70 is connected to capillary electrolytic thermometer 74, consisting of a capillary column of electrolyte whose resistance is a function of temperature. Segment 65 is connected to a dual-coil hygrometer similar to 73 except that it is designed to function at lower temperatures than 73, by using a higher percentage coating of the hygroscopic material on the glass surface. Segment 66 is connected to calibrating resistor 71 which serves to give a check on the operation of relaxation oscillator 43. As arm 64 rotates at, say, about 3 revolutions per minute, each of the devices when connected into the circuit of relaxation oscillator 43 causes to be transmitted by the circuit connected to output 76 of 43 (shown in Fig. 6) a radio signal with a modulation which is a function of light brightness, altitude, humidity, and temperature.

Figure 9:
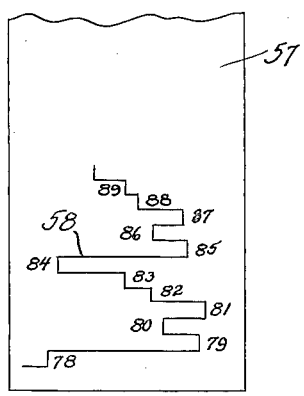
Fig. 9 shows the type of record produced by apparatus shown in Fig. 8 when received on apparatus in Fig. 7.

In Fig. 9 is shown a graphical record of the transmissions from an arrangement shown in Fig. 8. Here the graph 58 on paper 57 consists of portion 78 (light brightness) traced when arm 64 Fig. 8 touches segment 67; portion 79 (altitude) traced when arm Fig. 8 touches segment 68; portion 80 (high temperature humidity) traced when arm 64 Fig. 8 touches segment 69; portion 81 (temperature) traced when arm 64 Fig 8 touches segment 70; portion 82 (low temperature humidity) traced when arm 64 Fig. 8 touches segment 65; and portion 83 (reference frequency) traced when arm 64 Fig. 8 touches segment 66. Portions 84, 85, 86, 87, 88 and 89 are a repetition of the movement of arm 64 around the commutator. Thus a record of each effect is obtained three times per minute assuming 3 revolutions per minute of arm 64, Fig. 8.

Figure 10:
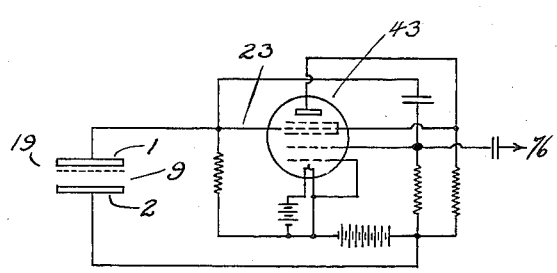
Fig. 10 shows a modification of Fig. 6 in which the "B" battery voltage is applied to the ionic altimeter.

In Fig. 10 is shown another circuit arrangement which lowers the effective resistance of the air gap 9 of ionic altimeter 19. In this form the ionic altimeter plate 2 is connected to the 90 volt positive side of the B battery 27, and the fourth grid 23 is connected to plate 1 of the ionic altimeter 19. The relaxation oscillator 43, illustrated, is the same as that shown in Fig. 6.

We claim:

1. In an air-borne radio altimeter or like free-air surrounded device of the type having means for generating a carrier wave and modulator means for applying thereto a resistance varied modulation signal; a sub-combination varying in resistance inherently in response to changes in atmospheric density comprising an ionized air gap electrically connected in controlling relation to said modulator, said air gap physically communicating with the air surrounding said device, and being of a length within the range over which an increase in gap length produces a decrease in resistance.

2. In a radiosonde or like device designed for continuous ascention through the air, and of a type having means for transmitting an impedance controlled signal; in sub-combination, a heat insulating housing having only restricted communication with the external atmosphere and thus providing for continuous expiration of air therefrom during a continuous ascent, whereby the atmosphere within said housing will remain substantially unaffected by external variations in temperature and humidity during the interval of an ascent, an ionized air gap within and subject only to the decreasing density of the atmosphere initially within said housing during an ascent, and means for connecting said air gap in controlling relation to the transmitting means of said radiosonde, whereby the impedance of said air gap reflected in the signal controlled thereby is a substantially accurate indication of the altitude of the radiosonde unaffected by variations in temperature, sunlight, and humidity of the atmosphere traversed during the continuous ascent.

3. In a radiosonde or like device designed for continuous ascention through the air, and of a type having means for transmitting an impedance controlled signal; in sub-combination, a housing having only restricted communication with the external atmosphere and thus providing for continuous expiration of air therefrom during a continuous ascent, whereby the atmosphere within said housing will remain substantially unaffected by external variations in humidity during the interval of an ascent, an ionized air gap within and subject only to the decreasing density of the atmosphere initially within said housing during an ascent, and means for connecting said air gap in controlling relation to the transmitting means of said radiosonde, whereby the impedance of said air gap reflected in the signal controlled thereby is a substantially accurate indication of the altitude of the raidosonde unaffected by variations in humidity of the atmosphere traversed during the continuous ascent.

FRANCIS W. DUNMORE.
EVAN G. LAPHAM.